INVENTORS
Walter B. Dean
John A. Germer
BY
William R. Nolte
AGENT

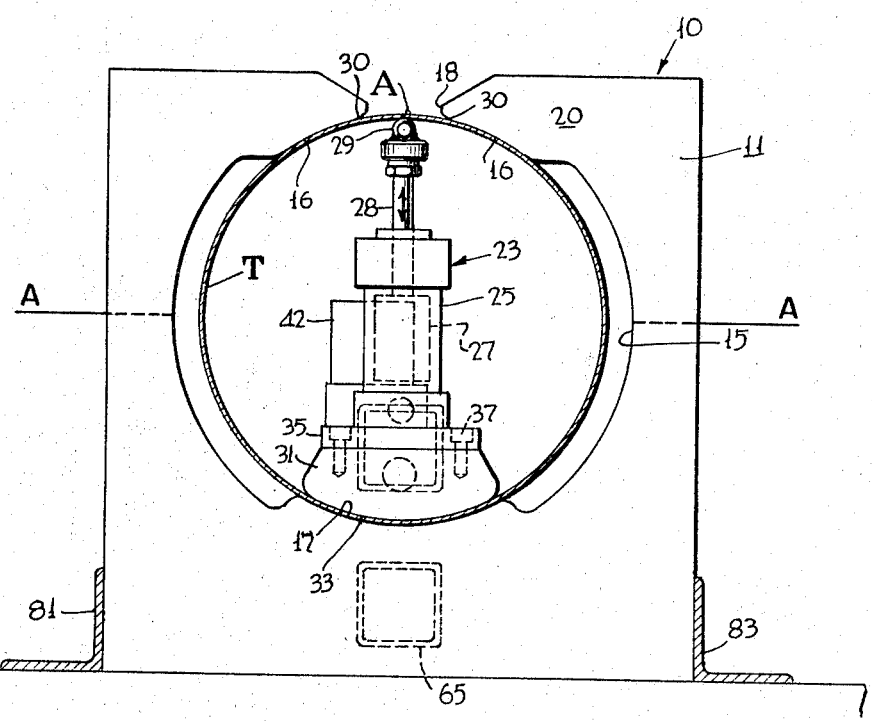
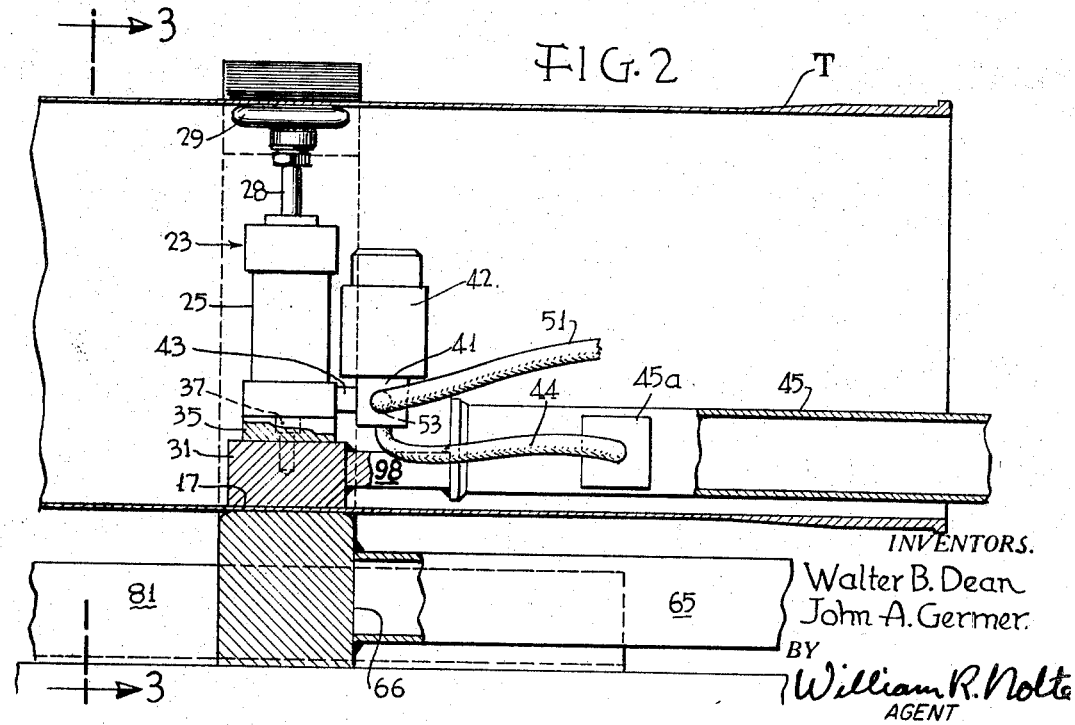

United States Patent Office 3,421,365
Patented Jan. 14, 1969

3,421,365
APPARATUS FOR INDUCING FATIGUE CRACKS IN MATERIALS
Walter B. Dean, Narberth, Pa., and John A. Germer, Blackwood, N.J., assignors, by mesne assignments, to the United States of America as represented by the Secretary of the Army
Filed Apr. 18, 1966, Ser. No. 543,421
U.S. Cl. 73—91
Int. Cl. G01n 3/08
3 Claims

ABSTRACT OF THE DISCLOSURE

An apparatus for inducing a fatigue crack in a discrete area of the outer surface of a tubular test specimen including a support to engage the outer surface of the specimen, bounding the discrete area and supporting the specimen against movement when a force applying means is applied to the discrete area of the test specimen from the inside of the tube. The apparatus includes a slidable positioning means to permit the force applying means to be moved relative to the support means and the test specimen being investigated.

---

This invention relates to method and apparatus for inducing fatigue cracks in materials and more particularly, to a method and apparatus wherein a stress field may be created cyclically in a material to mechanically grow fatigue cracks therein.

Heretofore a method of fatiguing a crack in a material such as a cylinder has been to fully pressurize the entire cylinder. This has been found to be disadvantageous in that besides fatiguing discrete areas of interest other areas including the end closures, not constituting part of the test, have also been subjected to stress. This has required the expenditure of attention to the end closures even though they were not the areas under investigation. In addition, depending upon the volume of the cylinder, the cycling time for producing alternate pressure changes within the cylinder have as a consequence been longer.

It is an object of this invention therefore to provide an improved method and apparatus for fatiguing materials which avoids one or more of the disadvantages of the prior art and which has improved cycling time.

It is a further object of this invention to provide an improved method and apparatus to develop fatigue cracks in structural materials, such as pressure vessels, to determine the critical notch or fracture toughness of discrete areas thereof by producing a stress field in selected areas without placing undue stresses on other areas of the pressure vessel.

It is believed that the above and other objects and advantages will become apparent from a consideration of the following detailed description when taken in conjunction with the accompanying drawing in which:

FIG. 2 is a side elevational view of a position of the apparatus shown in FIG. 1, greatly enlarged;

FIG. 3 is a view taken along the line 3—3 of FIG. 2, partly in section of the apparatus;

Figure 1:
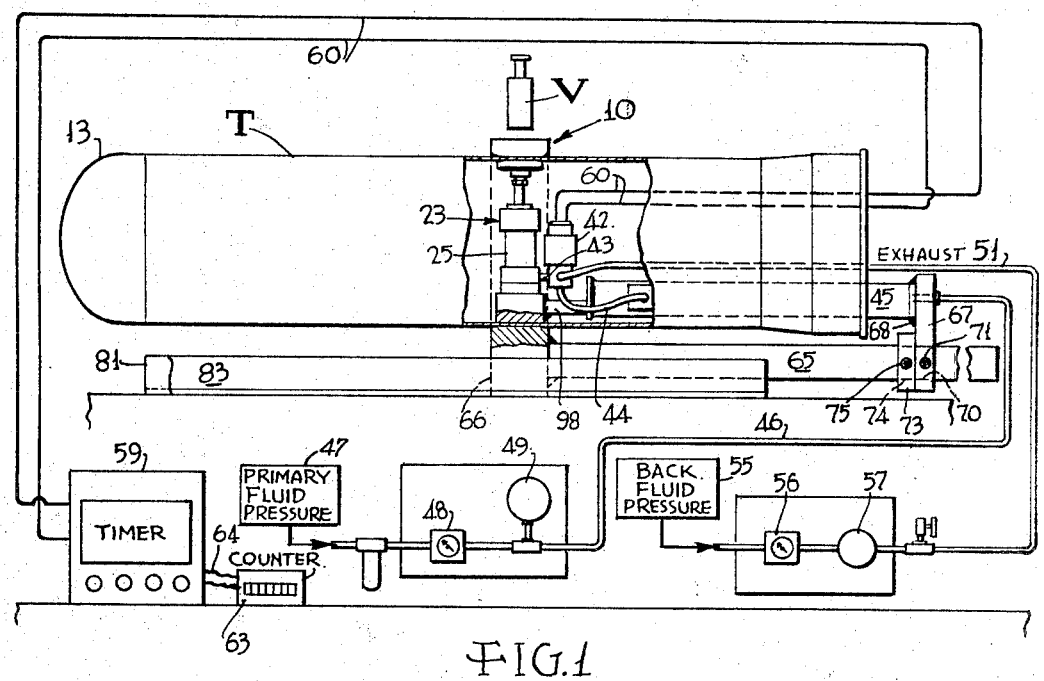
FIG. 1 is a side elevational view of the apparatus, partly schematic showing a test specimen in place.

Referring more in detail to the drawings wherein like parts are designated by like reference numerals, the reference numeral 10 is used to generally designate the apparatus embodying the invention, which comprises a support member 11 into which is inserted a test specimen T. In the present instance the piece to be tested is shown in the form of a spirally welded tube or cylinder which may be a missile casing having a rounded end closure 13. The support member for supporting the casing includes an opening 15 having a pair of radially inwardly extending pad portions 16 above, and a lower pad portion 17 below, which normally engage the outer peripheral surface of the test specimen T. The top portion of the support member 11 includes a viewing port as at 18 within its upper portion to define two opposed finger portions 19, 20 respectively. The opening 18 enables a discrete area A of the test piece which may have fatigue cracks therein to be observed by means of a viewing device V, such as a microscope, disposed in alignment with the opening.

The fatigue apparatus 10 is provided with a reciprocating force applying means 23 which may be received internally of the bore of the test casing, and includes, in the present form of the invention, a fluid cylinder 25 containing a piston 27, which drives a deflection bar 29 by means of interconnecting rod 28. The deflection bar makes line contact with and pushes the undersurface of the discrete area A, which is to be fatigued, up and down to develop a stress field and thereby grow fatigue cracks C in the pressure vessel or casing. An observer is thereby enabled to view the area under investigation to ascertain the critical notch or fracture toughness characteristics of the material forming the casing. The fingers 19, 20 are curved as at 30 so that as the wall of the casing is pushed upwardly, its upper surface is caused to conform thereto without unduly stressing the casing. In order to transmit and distribute the reactive forces, a shoe 31, having a curved surface 33 to fit the internal circumferential surface of the test specimen T, is affixed to the base 35 of the fluid cylinder as by screws 37.

Control of the pulsation of the fluid in the fluid cylinder 25 is obtained by a three-way solenoid valve actuated set 41. FIG. 2, the latter being driven by a solenoid unit 42 above. A conduit 43 provides a fluid path between the valve set 41 and to the lower surface of piston 27 within air cylinder 25. The valve set 41 may be of conventional construction and in the present instance as shown in FIG. 2 is connected on its bottom side by means of a flexible hose 44 for conveying a suitable source of primary pressure. The other end of the flexible hose 44 is connected to a hollow gage bar 45 as at plate connection 45a which conveys fluid under high pressure. For this purpose, as seen in FIG. 1, the rear end of the hollow gage bar away from the fluid cylinder 25 is connected to a flexible line 46, which in turn is supplied with a source of primary fluid pressure as at 47. A regulator 48, and pressure gage 49, are provided in the line 46 to monitor the primary pressure.

Figure 4:
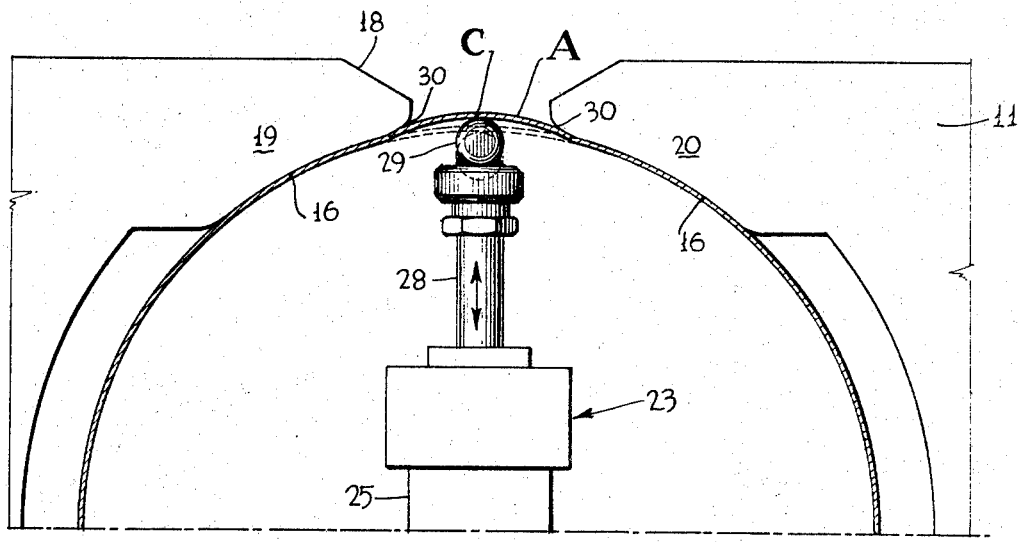
FIG. 4 is a partial view of the apparatus shown in FIG. 3 greatly enlarged and showing the test piece in a flexed or stressed condition.

Still referring to FIGS. 1 and 2, a flexible exhaust line 51 is also connected at one of its ends to the valve set 41 as at 53 and at its opposite end to a source of back pressure 55 of less magnitude than the primary pressure source. The back pressure serves to lock the deflection bar 29 against the inner circumferential surface of the test specimen T after alignment and prevents hammering during cycling. The line 51 likewise includes a regulator 56 and a pressure gage 57 to monitor the pressure therein. Both solenoid 42 and valve set 41 are of known construction and are well known in the art. Solenoid 42 in one state of operation is effective to close the exhaust line 51 and to open the primary pressure line 44 to high fluid pressure interiorly of the fluid cylinder 25. This drives its piston 27 of short stroke upwardly to in turn cause the deflection rod 29 to stress the test specimen T in the manner indicated in FIG. 4. When the solenoid 42 is actuated to its opposite state it is effective to open the exhaust line 51 which is connected to back pressure source 55 and to close or cut off the high pressure line 44, 46. Piston 27, within fluid cylinder 25, is thereby restored to its initial or lower position corresponding to the dotted line position shown in FIG. 4 by virtue of the elasticity of the test specimen T. In order to control the cycling of solenoid 42 a timer device 59 is operably connected to it as by leads 60. Additionally, an electric counter 63 may be suitably electrically connected to the circuitry as by leads 64 for recording the total number of cycles of stress applied to the workpiece.

Prior to initially inserting the test specimen T within the support member 11, the internal reciprocating force applying means 23 which includes fluid cylinder 25 may be moved out of vertical alignment with the support member 11. As seen in FIG. 1 member 11 has an adjusting gage bar 65 attached to its side face 66 in a suitable manner as by welding and extends beneath and in parallel relationship to the hollow gage bar 45 above. A slide plate 67 is affixed to the outer end of bar 45 as at 68 and extends downwardly and includes an opening as at 70 to receive the outer free end of adjusting bar 65. The latter plate may include a set screw device 71 to limit sliding movement relative thereto. A stop block 73 also having an opening 74 to receive adjusting bar 65 is received thereon and its position therealong may be set by set screw means 75. It is thus seen that the reciprocating force applying means 23 is secured to gage bar 45 by member 98, and may be slidingly moved to the right as seen in FIG. 1 relative to the bottom adjusting bar 65 to initially permit insertion of the test specimen T to the proper location to orient the discrete area A within the opening 18 defining the viewing post of the support 11. Thereafter the internal reciprocating fixture means 23 may be slidingly inserted within the bore of the test piece and moved so that the slide plate 67 strikes the stop block 73, in which position the internal reciprocating mechanism will be in proper alignment with the viewing port 18 of test piece support 11. It may be observed in FIGS. 2 and 3 that a pair of angle members 81, 83 respectively are affixed on either side of the latter support to maintain the same in a suitable upright position.

From the aforegoing it may be appreciated that depending upon the wall thickness and characteristics of the materials under test the fluid cylinder may be generally operated within a low range of pressures wherein the difference between the primary pressure in line 46 and the back pressure in line 51 times the area of the piston head 27 is the force required to cycle the mechanism. It may also be noted that high cycling speeds are possible because the volumes and pressures involved are small and by design may be kept in close proximity to the driving cylinder 23. Since low pressures may be employed it also becomes possible to view the test area A of the casing without the expense and complication of a safety shield.

It should be further noted that the casing support 11 may be split along the line A—A, and with suitable fastening elements securing the upper and lower portions together other configurations of test pieces could be readily accommodated.

While there have been described what are at present considered to be the preferred embodiments of this invention, it will be obvious to those skilled in the art that various changes and modifications may be made therein without departing from the invention and it is therefore aimed in the appended claims to cover all such changes and modifications as fall within the true spirit and scope of the invention.

We claim:

1. An apparatus for inducing a fatigue crack in a discrete area of the outer surface of a tubular test specimen comprising support means to engage the outer surface of the tube; said means defining an opening bounding said discrete area to support the tubular test specimen against movement when a force is applied to said discrete area of said tubular test specimen from the inside of the tube, force applying means for engagement with the inner surface of the test specimen, said force applying means comprises a bar which engages the inner surface of the test specimen normal to said discrete area, means for supporting said force applying means in alignment with said opening and means for intermittently actuating said force applying means including a cylinder means, a piston mounted for movement therein and connected to said force applying means whereby said test specimen corresponding to said discrete area is moved within said opening of said support means and is stressed thereby, a primary source of fluid pressure for actuating said piston in one direction and fluid pressure means to return the piston to its original position, and means responsive to drive cylinder pressure to actuate said means to return the piston to its original position, whereby repeated stresses may be induced in the discrete area of the specimen.

2. An apparatus as set forth in claim 1 including slidable positioning means secured to said support means and to said cylinder means to enable the latter to be moved relative to said support means and the test specimen being investigated.

3. An apparatus as set forth in claim 1 and including shoe means secured to said cylinder means for distributing reactive pressure forces from said cylinder through said support means.

References Cited

MTS Division, Research Incorporated, Minneapolis, Minn.

RICHARD C. QUEISSER, *Primary Examiner.*

J. H. WILLIAMSON, *Assistant Examiner.*